US012702256B2

(12) United States Patent
Hariharan

(10) Patent No.: US 12,702,256 B2
(45) Date of Patent: Aug. 11, 2026

(54) SHOWER CURTAIN LIFTING DEVICE

(71) Applicant: Ram Hariharan, Kirkland, WA (US)

(72) Inventor: Ram Hariharan, Kirkland, WA (US)

( * ) Notice: Subject to any disclaimer, the term of this patent is extended or adjusted under 35 U.S.C. 154(b) by 103 days.

(21) Appl. No.: 18/193,339

(22) Filed: Mar. 30, 2023

(65) Prior Publication Data

US 2024/0324828 A1 Oct. 3, 2024

(51) Int. Cl.
*A47K 3/38* (2006.01)
*A47H 99/00* (2009.01)
*F26B 9/10* (2006.01)

(52) U.S. Cl.
CPC ............... *A47K 3/38* (2013.01); *A47H 99/00* (2013.01); *F26B 9/10* (2013.01)

(58) Field of Classification Search
CPC . A47K 3/38; A47H 5/09; A47H 19/00; A47H 99/00; A47H 2201/00; Y10S 160/06
See application file for complete search history.

(56) References Cited

U.S. PATENT DOCUMENTS 1,047,526 A * 12/1912 Ice .......................... E04F 10/10 160/349.2
1,561,840 A * 11/1925 Faul ....................... A47H 19/00 248/308
4,058,873 A * 11/1977 Fischer .................. A47H 19/00 160/349.2
5,809,589 A * 9/1998 Johnson ................... A47K 3/38 160/349.2
7,686,062 B1 * 3/2010 Darnell .................. A47H 21/00 454/170
9,408,500 B2 8/2016 McFall
10,206,543 B2 * 2/2019 Maner ...................... A47K 3/38
11,026,546 B1 * 6/2021 Broussard ................ A47K 3/38

FOREIGN PATENT DOCUMENTS

CN 2165741 Y * 5/1994
DE 29606634 U * 7/1996

* cited by examiner

*Primary Examiner* — Erin Deery
(74) *Attorney, Agent, or Firm* — AMPACC Law Group, PLLC

(57) ABSTRACT

An apparatus that facilitates the drying of a shower curtain is described. In some embodiments, the apparatus is configured to lift a shower curtain away from a tub wall or other vertical surface in a shower or bathing area, such as a bathtub. For example, after a person showers, the apparatus can be removably attached to a central area of the shower curtain to lift the shower curtain away from a tub wall when the curtain is wet. Once lifted, a lower end of the shower curtain no longer contacts the tub wall, as the lifting of the shower curtain creates a space between the curtain and the tub wall through which air can flow. In such a position, the shower curtain can dry more quickly and avoid the growth of mildew, mold, and other undesirable substances or films, among other benefits.

12 Claims, 8 Drawing Sheets

SHOWER CURTAIN LIFTING DEVICE

BACKGROUND

A shower curtain is typically installed to prevent water from splashing outside of a bathtub or other washing/showering enclosure. For example, a typical bathtub is surrounded by walls on three sides, with a shower curtain that extends across a fourth, open side, to prevent water from spraying or splashing outside of the bathtub.

A shower curtain is often hung and extended across a rod, which spans the open side of the bathtub. The shower curtain, in a normal position, falls past a top edge of a wall or enclosure of the bathtub, and thus covers the open area when a person is showering. Often, a lower or bottom end of the shower curtain gets wet and can stick or adhere to the wall of the bathtub. This adherence can promote the growth of mold, mildew, and other unwanted films or substances onto the wet shower curtain and the tub enclosure. While a curtain can be cleaned, the process can be time-consuming, arduous, and ineffective, and users may instead choose to replace the dirty curtain with a new curtain.

These and other drawbacks exist with respect to conventionally hung shower curtains.

BRIEF DESCRIPTION OF THE DRAWINGS

Embodiments of the present technology will be described and explained using the accompanying drawings.

Figure 1:
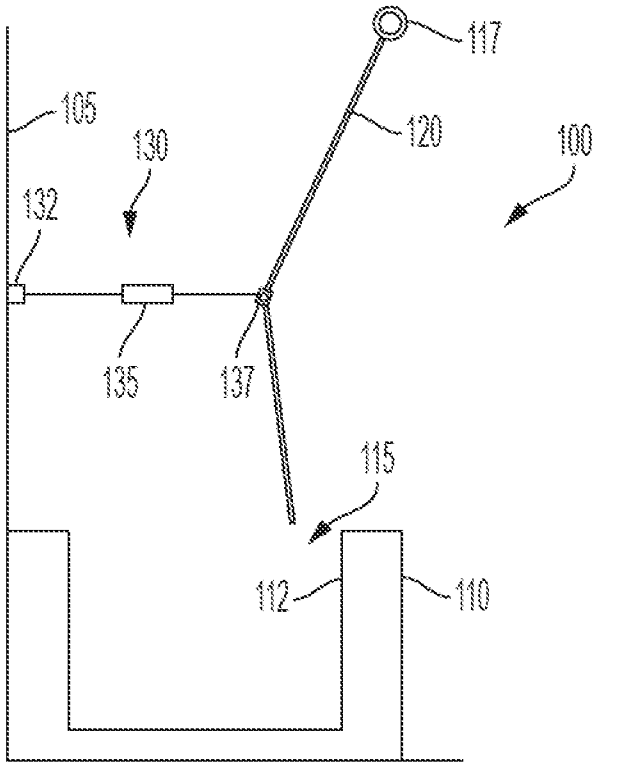
FIG. 1 is a diagram illustrating a lifted shower curtain.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

An apparatus that facilitates the drying of a shower curtain is described. In some embodiments, the apparatus is configured to lift a hung shower curtain away from a tub wall or other vertical surface in a shower or bathing area, such as a bathtub. For example, the apparatus, after a person showers, can be removably attached to a central area of the shower curtain to lift the shower curtain away from a tub wall when the curtain is wet.

Once lifted, a lower end of the shower curtain can no longer contact the tub wall, as the lifting of the shower curtain creates a space between the curtain and the tub wall through which air can flow. In such a position, the shower curtain can dry more quickly and avoid the growth of mildew, mold, and other undesirable substances or films, among other benefits.

In some embodiments, the apparatus is fixed to a wall of a shower or bathing area, such that the apparatus is hidden from view behind the shower curtain when the curtain is in the lifted position. For example, a tension is applied to a spring or other mechanism of the apparatus, which pulls the curtain toward the wall (and the lower end away from the tub wall). In some cases, the mechanism maintains the entire shower curtain in a position or orientation that prevents contact from any other objects or surfaces, such as the tub wall, a wall, enclosure, or other vertical surface, and so on In some embodiments, the apparatus includes a release mechanism, such as a spring-loaded component, which releases the tension applied to the shower curtain, after a certain time period or after a determination that the shower curtain is sufficiently dry. In some cases, the release mechanism causes the apparatus to decouple from the shower curtain, which then falls back to its original, normal position.

A shower curtain itself, in some embodiments, can include features that facilitate prevention or mitigation of mold/mildew growth. For example, the shower curtain can include spacers and/or air channels that facilitate the formation of air pockets or spaces between the lower end of the curtain and the tub wall or other similar surface to which the curtain sticks or otherwise contacts.

Thus, the apparatuses, in the various embodiments described herein, provide for a shower curtain that stays clean and sanitary using simple, efficient mechanisms, among other benefits.

Various embodiments of the technology will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Shower Curtain Lifting Apparatus

As described herein, in some embodiments, an apparatus or device that facilitates the drying of a shower curtain is described. The apparatus can be configured to lift a hung shower curtain away from a tub wall or other vertical surface in a shower or bathing area, such as a bathtub. For example, the apparatus, after a person showers, can be removably attached to a central area of the shower curtain to lift the shower curtain away from a tub wall when the curtain is wet. Thus, the apparatus or device can enable a bather to perform a simple action or movement (e.g., a single gesture or contact with one or a few fingers) when in operation.

FIG. 1 is a diagram 100 illustrating a lifted shower curtain 120. The shower curtain 120 is lifted away from a side wall 112 of a bathtub 110. For example, the shower curtain 120 hangs from a curtain rod 117 and is pulled away from the side wall 112 of the bathtub 110 by a lifting apparatus 130 (e.g., a "curtain lift" or "curtain pull"). The lifting apparatus 130 is fixed at one end to a wall 105 (e.g., an inner wall of a shower or bathing area) via a wall attachment component 132, which can be a hook, magnet, suction cup, adhesive, or other mechanical or chemical attachment mechanism or device that fixes the lifting apparatus 130 to the wall 105 or to an anchor, hook, or other device on the wall 105 (or to the wall itself).

The lifting apparatus 130 also includes a curtain attachment component 137, such as a magnet (which mates with a magnetic element in the curtain 120 or on either surface of the curtain 120, as described herein), a clip, a clamp, a hook, and so on. Attachment component 137 may be simple or have other attachments to facilitate operation. Further, the lifting apparatus 130 includes a curtain lift mechanism 135, such as a spring or other mechanical device that produces or applies a restoring force when stretched/compressed/released.

The curtain lift mechanism 135 can facilitate a simple attachment of the curtain 120 to the wall 105 or mechanism 135 and/or enable movement of the curtain 120 without undue forces applied to the curtain 120. For example, a user places their finger on the magnet, located on the outside of the curtain. The user pushes the magnet forward, which traces a generally curved path until contacting the lowest part of the lifting apparatus 130. Then, the user releases their finger, and the curtain descends until the increasing force from curtain lift mechanism 135 matches the force of the curtain pulling toward its normal resting position.

As another example, after showering, a user can fix the curtain attachment component 137 (such as via a rod) to the shower curtain 120 (e.g., via a magnet-to-magnet connection), and the apparatus 130, via an applied tension, pulls the curtain 120 up and away from the bathtub 110 (creating a space 115 for air flow).

Figure 2:
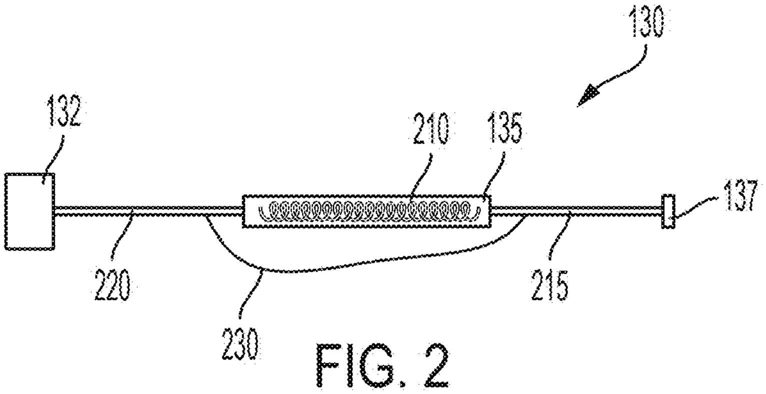
FIG. 2 is a diagram illustrating example components of a lifting apparatus.

FIG. 2 illustrates various components of the lifting apparatus 130. As described herein, the curtain lift mechanism 135 includes or contains a spring 210, which is coupled to the curtain attachment component 137 via a first cord 215 (or string, rope, chain, and so on) and coupled to the wall attachment component 132 via a second cord 220 (or string, rope, chain, and so on). The spring 210 can manage forces applied to the lifting apparatus 130 by the wall 105 and/or the curtain 120, as well as apply a tension force to the curtain 120 as it lifts the curtain from the side wall 112 of the bathtub 110.

In some cases, the lifting apparatus 130 can include a load element 230, which is disposed at a fixed length between the first cord 215 and the second cord 220. The load element 230 can prevent the spring 210 from being extended past a certain length, such as to a length that can cause deformation. The load element 230, therefore, can mitigate any load applied to the spring 210 due to the weight of the curtain, preventing over-extension, and possible deformation, of the spring 210, among other benefits.

In some cases, the curtain lift mechanism 135 can include other components that apply restorative and/or slow-acting forces to the shower curtain 120. For example, sliding pads (e.g., gel pads), spring loaded arms, and other similar devices (possibly in combination) could be utilized to lift the curtain 120 away from the bathtub 110.

Figure 3:
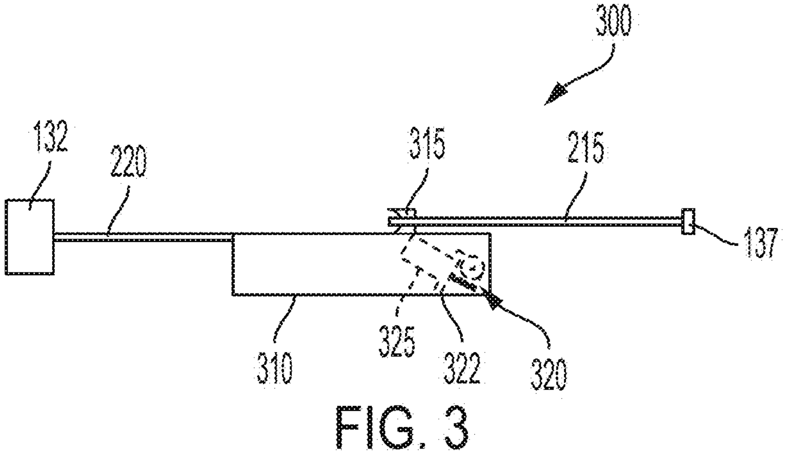
FIG. 3 is a diagram illustrating a lifting apparatus having a spring-actuated curtain release mechanism.

As described herein, in some embodiments, the lifting apparatus 130 includes a mechanism configured to automatically release the shower curtain 120 from a lifted position without a user manually removing the apparatus 130 from the curtain 120. FIG. 3 is a diagram illustrating a lifting apparatus 300 having a spring-actuated curtain release mechanism 310.

The spring-actuated curtain release mechanism 310 includes a cord holder 315, which can be part of a housing of the mechanism 310 shaped to maintain the cord 215 in a taut or tensed form when fixed to a shower curtain. As shown, the cord holder 315 can have a shape (e.g., a hook or other curved shape) that holds a loop at the end of the cord 215.

Figure 4A:
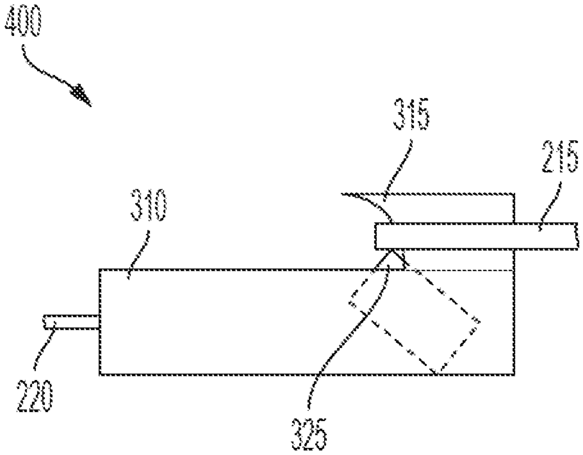
FIGS. 4A-4B are diagrams illustrating operation of the spring-actuated curtain release mechanism.
Figure 4B:
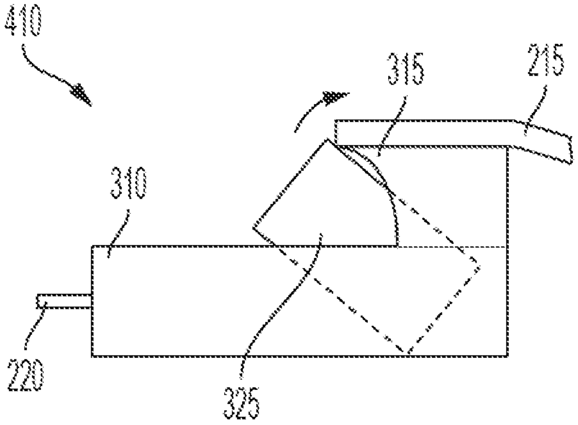

Within the housing of the mechanism 310 is a sliding plate or element 325, which moves in response to a spring 322 coupled to the sliding plate 325. The sliding plate or element 325 can have various shapes or configurations configured to push the cord 215 out of or past the cord holder 315. A dial 320 (or slide) adjusts the pressure spring 322 places on sliding plate (or post) 325. FIGS. 4A-4B illustrate operation of the spring-actuated curtain release mechanism 310. FIG. 4A depicts a connected state 400, where the cord is attached to the mechanism 310 within (or partially within) the cord holder 315 of the mechanism 310.

The cord 215 applies a force due to the weight of the shower curtain 120, which is wet (e.g., after a shower). The force is applied downward and maintains the sliding plate 325 in a recessed position, counteracting an upward force applied to the cord 215 by the spring 322 and adjusted by the dial 320, which are coupled to the sliding plate 325.

When the curtain dries it becomes less heavy and, as depicted in FIG. 4B, causes the mechanism 310 to transition to a release state 410, where the sliding plate 325 moves upwards and pushes the cord 215 out of the cord holder 315, releasing the shower curtain 120 to its normal position. That is, the force applied by the sliding plate 325 is greater than the force applied by the cord 215 due to the weight of the shower curtain 120 (now dry), and the sliding plate 325 moved upwards and releases the cord 215 from the mechanism.

Figure 5:
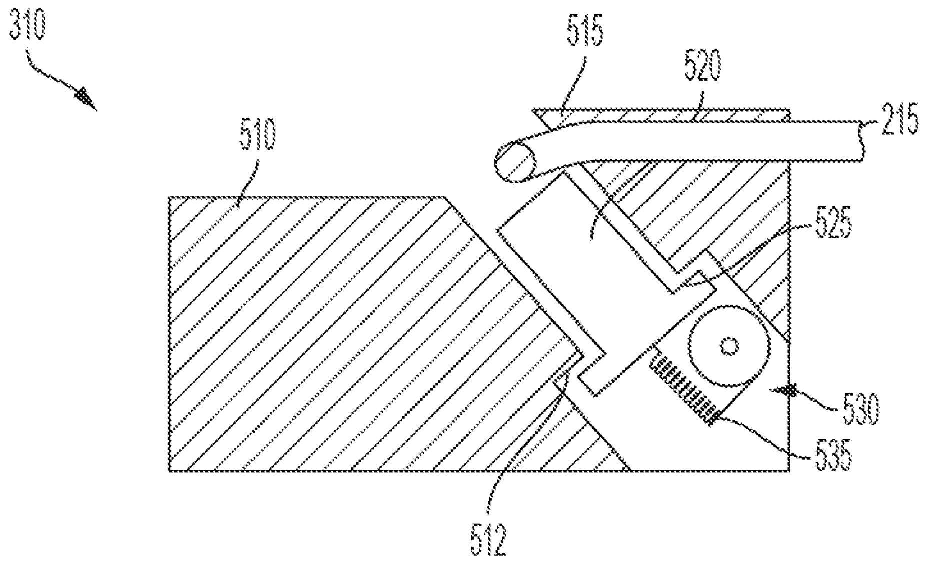
FIG. 5 is a diagram illustrating example components of the spring-actuated curtain release mechanism.

FIG. 5 illustrates the components of the spring-actuated curtain release mechanism 310. As described herein, the mechanism 310 includes a housing 510 that contains a sliding plate 520, which is maintained in a recessed position by the cord 215, which is positioned or disposed within a cord holder 515 or cord area of the housing 510. The sliding plate 520 can include one or more stops 512, which can contact a lip or shelf within an inner area of the housing 510, preventing the sliding plate 520 from extending too far out of the housing 510.

The sliding plate 520 is coupled to a dial 530 and spring 535, which apply the upwards force to the sliding plate 520 in the housing 510. In some cases, the dial 530 is notched, and the amount of force can be adjusted or modified by rotating the dial in either direction (or otherwise adjusting the applied force using other adjustment mechanisms), causing the spring 535 to expand or compress. Further, the sliding plate 520 can include ridges or grooves on a top or side surface, which can assist in guiding the movement of the sliding plate 520 in the up and down directions (e.g., recessed and/or extended positions).

In some embodiments, the spring-actuated curtain release mechanism 310 (or other mechanisms described herein) can include one or more components that facilitate an automatic release of a cord that is looped or otherwise attached when a curtain is lifted by the lifting apparatus 130. For example, the mechanism 310 can include other components or configurations not specifically described herein that are adapted to hold the cord (and the curtain) for an initial period, and then release the cord (and curtain) upon certain conditions being met or satisfied.

In some cases, the release mechanism 310 can trigger or otherwise cause a sprayer or spraying mechanism to release a substance into the air surrounding the curtain. For example, upon releasing the curtain, the spraying mechanism can release or emit a scent, disinfectant, and so on, which utilizes a force of the curtain being released (e.g., falling down/away from the wall) to assist in actuating the spraying mechanism.

Figure 6:
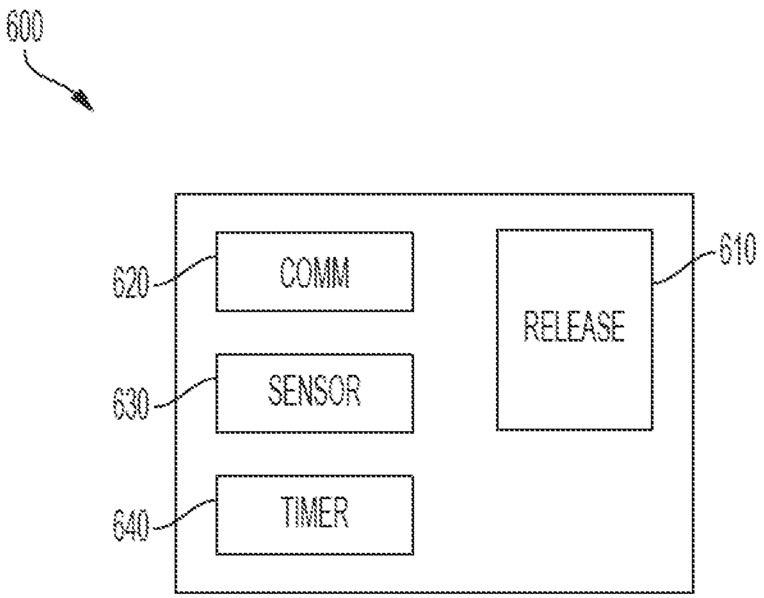
FIG. 6 is a diagram illustrating example action modules of a curtain release mechanism.

FIG. 6 is a diagram illustrating example action modules for a curtain release mechanism 600. The mechanism 600 can include a release module, such as a spring-actuated mechanism or other similar actuator that causes the release of a cord in response to a trigger, command, or condition.

The curtain release mechanism 600 can also include action modules that determine, cause, and/or apply triggers to the mechanism 600. For example, the action modules can include a communication module 620, a sensor module 630, and a timer module 640.

In some cases, the communication module 620 can include components configured to receive and/or transmit messages or other communications from external devices, such as from a home network server or IoT (internet of things) server, or other remote devices (e.g., a user mobile device). The communication module 620 can be a Bluetooth component, a Wi-Fi component, an MQTT (MQ telemetry transport) component, and so on. For example, the communication module 620 can receive a message or command from a fan or vent or HVAC system of a bathroom that includes a shower curtain (e.g., a message based on the humidity of the bathroom falling below a certain threshold level), which triggers the release module 610 to release the curtain.

Similarly, the mechanism 600 can provide data to the home network server, such as information that indicates the curtain is still wet. The home network server, in such cases, can continue to run the fan or vent until confirmation that the curtain is dry, and/or perform other actions, such as emit ozone to prevent or remove the occurrence of mold while also running a fan to remove the ozone from the bathroom.

In some cases, the sensor module 630 can sense, capture, or measure certain conditions associated with a shower curtain, and when the measured conditions satisfy a threshold, trigger the release module 610. For example, the sensor module 630 can include components that sense humidity and/or temperature and trigger the release module 610 to release the curtain when the sensed conditions fall below a certain threshold (e.g., the humidity level falls below 50 percent). Further, in some cases, the curtain itself can include sensors that detect humidity and send captured humidity measurements to the mechanism 600.

In some cases, the timer module 640 can determine a certain time duration or amount of time has elapsed since a curtain was lifted and trigger the release module 610 to release the curtain. For example, the timer module 640 can be set for a 20-minute, 30-minute, or 60-minute time period, and cause a release of a shower curtain when the set time elapses.

Thus, in various embodiments, the lifting apparatus 130 includes a release mechanism that releases after shower curtain the curtain has dried or has likely dried, enabling the apparatus 130 to allow the curtain to fall to a normal, hanging position when there is a low or comparatively lower likelihood for mildew/mold growth. The apparatus 130, therefore facilitates the curtain to move back to a normal position, which can be more visually pleasing, when dry and unlikely to adhere to a bathtub, without a user having to manually release the curtain, among other benefits.

FIG. 6 and the components, modules, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry.

Figure 7:
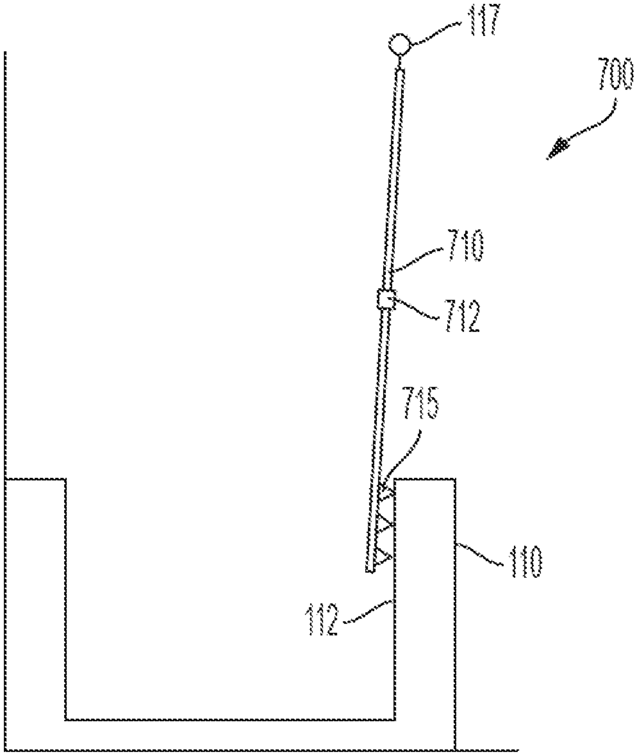
FIG. 7 is a diagram illustrating an example shower curtain having one or more spacers.

As described herein, in some embodiments, a shower curtain, such as the shower curtain 120, can include components or features that mitigate or prevent adhesion to a tub wall or other similar surface. FIG. 7 is a diagram illustrating an example shower curtain 700 having one or more spacers 715.

As depicted, the curtain 710 has multiple spacers 715 applied, fixed, or disposed to a curtain body 710 of the curtain 710. The spacers can have various shapes or geometries, including a triangular shape, rod shape, circular shape (e.g., concave or convex), and so on. Further, the spacers can include magnets (disposed internally), which can assist in locating the spacers to the wall 112 of the bathtub 110.

The curtain body 710, as described herein, can also include a magnet 712 or similar component that facilitates lifting the curtain 700 by the lifting apparatus 130. Thus, the shower curtain 700 can include one or more spacers 710 to prevent adhesion to the bathtub 110, as well as components that facilitate lifting the curtain 700 when in a wet state (e.g., after a shower), providing a combination of features to protect the curtain from the growth of mildew, mold, and other unwanted substances.

Figure 8:
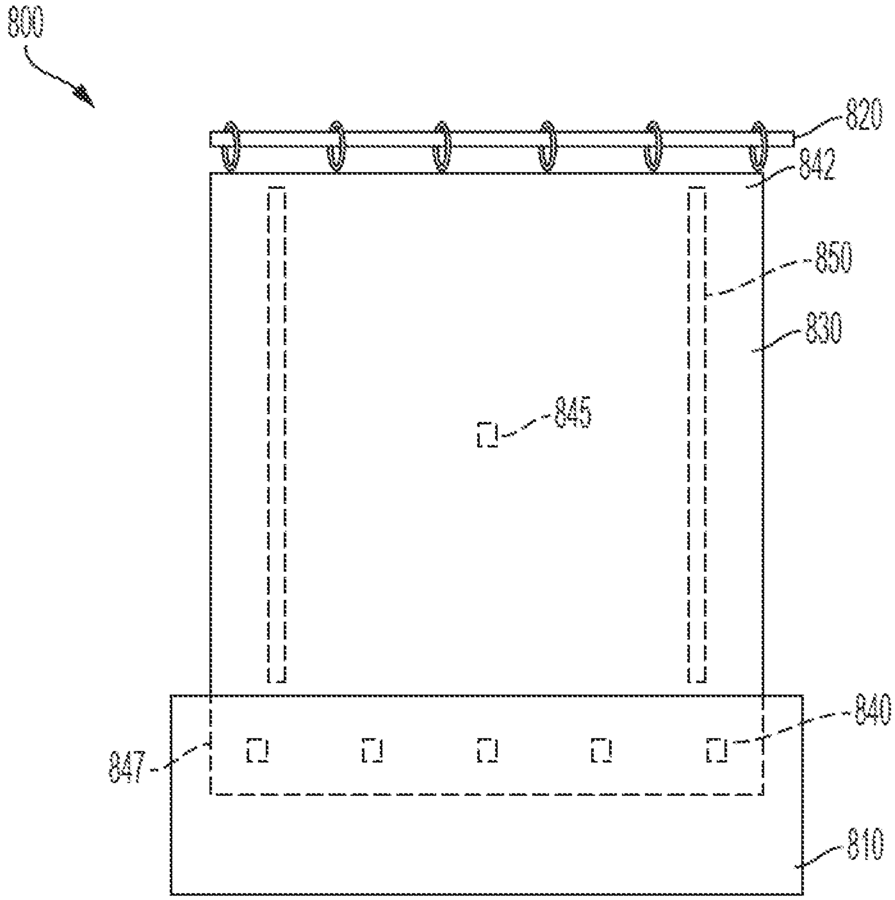
FIG. 8 is a diagram illustrating an example shower curtain having various drying components.

A shower curtain, therefore, can include various components that facilitate air flow at a lower end. FIG. 8 is a diagram illustrating an example shower curtain 800 having various drying components. The curtain 800 hangs over a bathtub 810 from a curtain rod 820. The curtain 800 includes a curtain body 830, having a lower end 847 that is proximate to the bathtub 810 (e.g., hanging near or past the top edge of the bathtub 810), and a top or upper end 842, which included holes or openings to facilitate attachment of the curtain 800 to the curtain rod 820.

The curtain body 830, as described herein, includes one or more spacers 840, a magnet 845, and air channels 850. The spacers 840 prevent the lower end of the curtain 800 to contact or adhere to the bathtub and are disposed on an inner side of the curtain 800 (e.g., a side or surface facing the inner area of the bathtub 810). The magnet 845, as described herein, can facilitate attachment to the lifting apparatus 130, which lifts the curtain up and away from the bathtub 810 after a shower (and can then release the curtain to an original position).

The air channels 850 (or tubes), which are disposed within the curtain body 830, can assist in moving air to the lower end 847 of the curtain 800. The air channels 850, in some embodiments, can receive a hair dryer or similar device, and cause hot air to travel down the curtain 800, drying the curtain 800.

Figure 9:
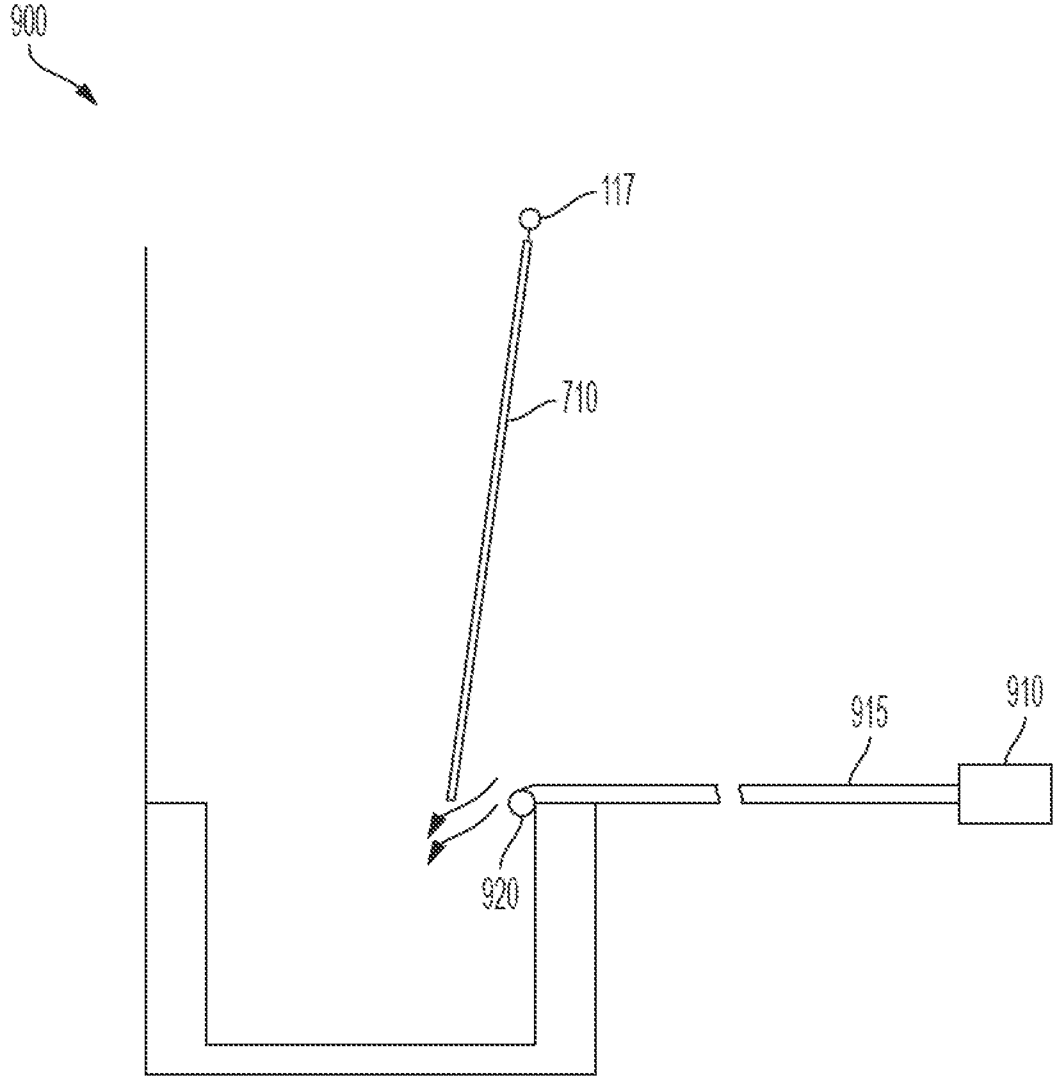
FIG. 9 is a diagram illustrating an example shower enclosure having a drying mechanism.

In other cases, the tub or tub wall can include similar air channels, such as tubes or vents, that direct air (e.g., warm air) to a space between the curtain and the tub. FIG. 9 is a diagram illustrating an example shower enclosure 900 having a drying mechanism.

A tube 920, or vent, can be disposed and/or positioned on an edge of a tub or tub wall. For example, the tube 920 can run parallel to a top edge of the tub wall and include various holes or vents that facilitate warm air, received from a drying device 910 (e.g., an attached hair dryer, a bathroom vent or heat source, and so on), which can be coupled via a tube or hose 915 to the tube/vent.

The tube 920, positioned near or proximate to the curtain 710, can emit or blow warm air to a space between the curtain 710 and the tub wall, moving or shaking the curtain 710 away from the tub wall, enabling the curtain 710 to dry more quickly. For example, the warm air can dry moisture on the curtain 710, can cause the curtain 710 to move in space (thus shaking off moisture), or otherwise reduce humidity in the area where the curtain 710 is proximate to the tub/tub wall.

Thus, in various embodiments, a shower curtain can include features that assist in preventing adhesion to a bathtub and/or moving air to spaces formed between the bathtub and the curtain, among other benefits.

Further, the shower curtain can be sold or provided separately, or as part of a kit that includes the lifting apparatus. Further, the lifting apparatus can be sold or provided separately, or in combination with a shower curtain having some or all of the features described herein.

Examples of the Disclosed Technology

In some embodiments, an apparatus includes a curtain lift mechanism that lifts a shower curtain from a first position to a second position and a release mechanism that releases the shower curtain from the second position to the first position.

In some cases, the apparatus can further include a wall attachment component that fixes a first end of the apparatus to a wall and a curtain attachment component that removably fixes a second end of the apparatus to the shower curtain.

In some cases, the curtain lift mechanism includes a spring that is disposed between the wall attachment component and the curtain attachment component.

In some cases, the curtain attachment mechanism is a magnet that secures a magnet of the shower curtain to the apparatus.

In some cases, the release mechanism includes a spring-loaded component that releases the shower curtain in response to a change of weight of the shower curtain.

In some cases, the release mechanism includes a spring-loaded component that releases the shower curtain after a certain period ends.

In some cases, the release mechanism includes a spring-loaded component that releases the shower curtain after the humidity within a room that contains the shower curtain is below a threshold humidity level.

In some cases, the release mechanism included an internet of things (IoT) device that communicates with a device of or in the room that contains the shower curtain to determine when to release the shower curtain.

In some cases, the release mechanism includes a spring-loaded component that releases the shower curtain and an internet of things (IoT) device that communicates with a device of a room that contains the shower curtain to determine when to release the shower curtain.

In some embodiments, a shower curtain includes a curtain body, an attachment end that attaches to a curtain rod and is disposed at a top end of the curtain body, and one or more spacers disposed at a bottom end of the curtain body.

In some cases, the one or more spacers disposed at the bottom end of the curtain body have a triangular shape.

In some cases, the one or more spacers disposed at the bottom end of the curtain body include magnets.

In some cases, the curtain body includes a magnet disposed at a central area of the curtain body.

In some cases, the curtain body includes one or more vertically oriented tubes that facilitate a flow of air from a top end of the curtain body to the bottom end of the curtain body.

In some embodiments, an apparatus that lifts a shower curtain includes a wall attachment component that fixes a first end of the apparatus to a wall, a curtain attachment component that removably fixes a second end of the apparatus to a shower curtain, and a curtain lift mechanism that lifts the shower curtain from a first position to a second position.

In some cases, the shower curtain is proximate to a tub wall of a bathtub in the first position and is not proximate to the tube wall of the bathtub in the second position.

In some cases, the apparatus includes a release mechanism that releases the shower curtain from the second position to the first position based on a force applied to the apparatus by the shower curtain.

In some cases, the apparatus includes a release mechanism that releases the shower curtain from the second position to the first position based on a humidity of an environment surrounding the shower curtain falling below a threshold level.

In some cases, the apparatus includes a release mechanism that releases the shower curtain from the second position to the first position after a certain duration of time.

In some cases, the apparatus includes a release mechanism that releases the shower curtain from the second position to the first position in response to receiving a command from a home network device.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the shower curtain, mechanisms, and/or devices described herein can vary considerably in their implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. An apparatus, comprising:
- a curtain lift mechanism that attaches to and lifts a shower curtain from a first position to
  - a second position towards a vertical surface proximate to a bathtub,
  - wherein the apparatus is fixed to the vertical surface and extends into an area
    - above the bathtub when attached to the shower curtain; and
- a release mechanism that releases the shower curtain from the second position to the first position,
  - wherein the release mechanism includes a spring-loaded component that releases the shower curtain from the second position to the first position in response to a change of weight of the shower curtain, and
  - wherein the spring-loaded component includes:
    - a cord holder configured to maintain a cord attached to the release mechanism and the curtain attachment component; and
    - a sliding plate configured to release the cord from the cord holder in response to the change of weight of the shower curtain.

2. The apparatus of claim 1, wherein the apparatus includes:
- a wall attachment component that fixes a first end of the apparatus to the vertical surface; and
- a curtain attachment component that removably fixes a second end of the apparatus to the shower curtain such that the apparatus only extends into the area above the bathtub when fixed to the shower curtain.

3. The apparatus of claim 2, wherein the curtain lift mechanism includes a spring that is disposed between the wall attachment component and the curtain attachment component.

4. The apparatus of claim 2, wherein the curtain attachment mechanism is a magnet that secures a magnet of the shower curtain to the apparatus.

5. An apparatus that lifts a shower curtain, the apparatus comprising:
- a wall attachment component that fixes a first end of the apparatus to a vertical surface that is proximate to a bathtub;
- a curtain attachment component that removably fixes a second end of the apparatus to a shower curtain;
- a curtain lift mechanism that lifts the shower curtain from a first position to a second position,
  - wherein the apparatus extends from the vertical surface and into an area above the bathtub when attached to the shower curtain; and
- a release mechanism that releases the shower curtain from the second position to the first position,
  - wherein the release mechanism includes a spring-loaded component that releases the shower curtain from the second position to the first position in response to a change of weight of the shower curtain, and
  - wherein the spring-loaded component includes:
    - a cord holder configured to maintain a cord attached to the release mechanism and the curtain attachment component; and
    - a sliding plate configured to release the cord from the cord holder in response to the change of weight of the shower curtain.

6. The apparatus of claim 5, wherein the shower curtain is proximate to a tub wall of the bathtub in the first position and is not proximate to the tub wall of the bathtub in the second position.

7. The apparatus of claim 5, wherein the curtain lift mechanism includes a spring that is disposed between the wall attachment component and the curtain attachment component.

8. The apparatus of claim 5, wherein the curtain attachment component is a magnet that secures a magnet of the shower curtain to the apparatus.

9. An apparatus, comprising:
- a curtain lift mechanism that attaches to and lifts a shower curtain from a first position to a second position; and
- a release mechanism that releases the shower curtain from the second position to the first position,
  - wherein the release mechanism includes a spring-loaded component that releases the shower curtain from the second position to the first position in response to a change of weight of the shower curtain, and
  - wherein the spring-loaded component includes:
    - a cord holder configured to maintain a cord attached to the release mechanism and the curtain attachment component; and a sliding plate configured to release the cord from the cord holder in response to the change of weight of the shower curtain.

10. The apparatus of claim 9, wherein the apparatus includes:

a wall attachment component that fixes a first end of the apparatus to a vertical surface proximate to a bathtub; and a curtain attachment component that removably fixes a second end of the apparatus to the shower curtain such that the apparatus extends into the area above the bathtub when fixed to the shower curtain.

11. The apparatus of claim 9, wherein the curtain lift mechanism includes a spring that is disposed between the wall attachment component and the curtain attachment component.

12. The apparatus of claim 9, wherein the curtain attachment mechanism is a magnet that secures a magnet of the shower curtain to the apparatus.

* * * * *